*(12)* United States Patent
Dagan et al.

(10) Patent No.: US 7,290,098 B2
(45) Date of Patent: *****Oct. 30, 2007

(54) METHOD AND APPARATUS FOR INTERLEAVING DATA STREAMS

(75) Inventors: Amit Dagan, Haifa (IL); Israel Hirsh, Kiryat-Motzkin (IL); Ofir Avni, Ram-on (IL)

(73) Assignee: Intel Corporation, Santa Clara, CA (US)

( * ) Notice: Subject to any disclaimer, the term of this patent is extended or adjusted under 35 U.S.C. 154(b) by 510 days.

This patent is subject to a terminal disclaimer.

(21) Appl. No.: 10/772,895

(22) Filed: Feb. 4, 2004

(65) Prior Publication Data

US 2004/0158693 A1     Aug. 12, 2004

Related U.S. Application Data

(63) Continuation of application No. 09/823,527, filed on Mar. 30, 2001, now Pat. No. 6,760,822.

(51) Int. Cl.
*G06F 12/00* (2006.01)
*G11C 8/00* (2006.01)

(52) U.S. Cl. ............. 711/157; 365/230.03; 365/230.04

(58) Field of Classification Search ................. None
See application file for complete search history.

(56) References Cited

U.S. PATENT DOCUMENTS

| 5,586,306 A | 12/1996 | Romano et al. |
| 5,668,974 A | 9/1997 | Grassi et al. |
| 6,151,296 A | 11/2000 | Vijayan et al. |
| 6,154,452 A | 11/2000 | Marko et al. |

OTHER PUBLICATIONS

Sklar, Bernard, "Digital Communication," 1988, Prentice Hall, Inc. pp. 357-358.

*Primary Examiner*—Reginald Bragdon
*Assistant Examiner*—Mehdi Namazi
(74) *Attorney, Agent, or Firm*—Blakely, Sokoloff, Taylor & Zafman LLP

(57) ABSTRACT

In one embodiment, an optimized interleaving instruction is provided. The interleaving instruction facilitates a bit-level interleaving of two streams of data stored in two source registers into a combined stream of data.

11 Claims, 6 Drawing Sheets

US 7,290,098 B2

METHOD AND APPARATUS FOR INTERLEAVING DATA STREAMS

RELATED APPLICATIONS

This application is a continuation of U.S. patent application Ser. No. 09/823,527, filed on Mar. 30, 2001, now U.S. Pat. No. 6,760,822, issued on Jul. 6, 2004, which is hereby incorporated by reference.

BACKGROUND OF THE INVENTION

Open Systems Interconnection (OSI) is a standard description or "reference model" for how messages should be transmitted between any two points in a telecommunication network. The purpose of OSI is to guide product implementors so that their products will consistently work with other products. The reference model defines seven layers of functions that take place at each end of communication. The first layer (also referred to as the physical layer) conveys the bit stream through the network at the electrical and mechanical levels. The physical layer provides the hardware means of sending and receiving data on a carrier. The physical layer is defined by various specifications. For instance, the IEEE 802.11a standard defines the physical layer for wireless LAN communications, Bluetooth™ defines the physical layer for communications involving mobile phones, computers, and personal digital assistants, etc.

A number of current physical layer algorithms involves bit manipulation of data streams. For instance, the "Convolutional Encoder" algorithm used in the IEEE 802.11a standard generates two streams of encoded bits which are then interleaved into a single stream of data using the "Interleaver" algorithm. Naive software implementation of the "Interleaver" algorithm would result in an inefficient and time-consuming code. Thus, a mechanism for optimizing existing physical layer algorithms is needed.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF EMBODIMENTS

Figure 1:
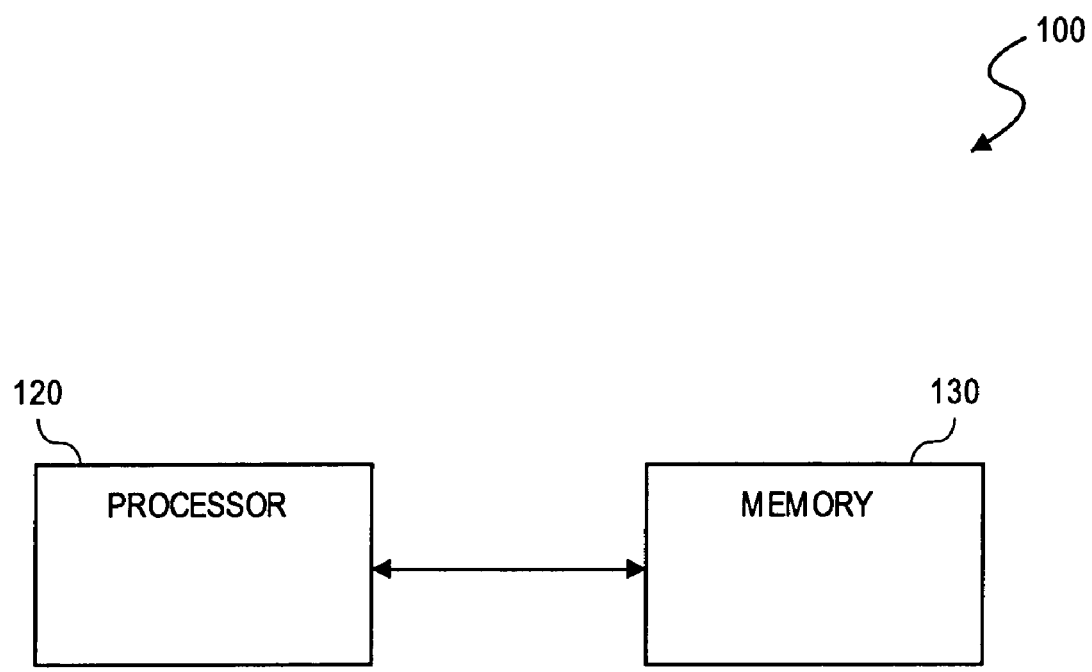
FIG. 1 is a block diagram of one embodiment of a processing system.

A method and apparatus for interleaving two streams of data are described. In the following description, for purposes of explanation, numerous specific details are set forth in order to provide a thorough understanding of the present invention. It will be apparent, however, to one skilled in the art that the present invention can be practiced without these specific details.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus. Instructions are executable using one or more processing devices (e.g., processors, central processing units, etc.).

The algorithms and displays presented herein are not inherently related to any particular computer or other apparatus. Various general purpose machines may be used with programs in accordance with the teachings herein, or it may prove convenient to construct more specialized apparatus to perform the required method steps. The required structure for a variety of these machines will appear from the description below. In addition, the present invention is not described with reference to any particular programming language. It will be appreciated that a variety of programming languages may be used to implement the teachings of the invention as described herein.

In the following detailed description of the embodiments, reference is made to the accompanying drawings that show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

FIG. 1 is a block diagram of one embodiment of a processing system. Processing system 100 includes processor 120 and memory 130. Processor 120 can be any type of processor capable of executing software, such as a microprocessor, digital signal processor, microcontroller, or the like. Processing system 100 can be a personal computer (PC), mainframe, handheld device, portable computer, set-top box, or any other system that includes software.

Memory 130 can be a hard disk, a floppy disk, random access memory (RAM), read only memory (ROM), flash memory, or any other type of machine medium readable by processor 120. Memory 130 can hold data and also store instructions for performing the execution of the various method embodiments of the present invention such as a method 300 described below in conjunction with FIGS. 3.

Figure 2:
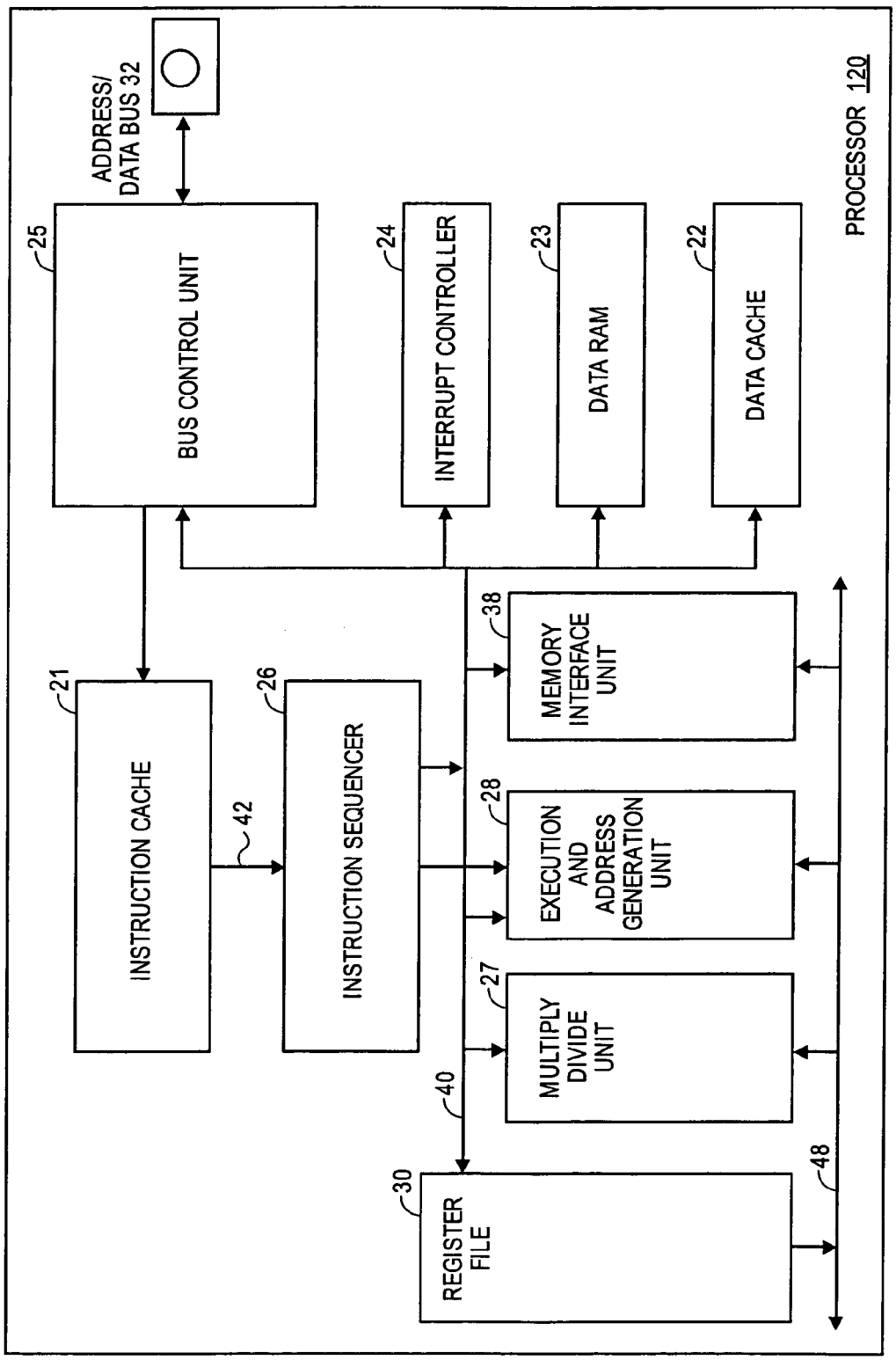
FIG. 2 is a block diagram illustrating an exemplary processor in which one embodiment of the present invention may be implemented.

Referring now to FIG. 2, a more detailed block diagram of an exemplary processor 120 in which the present invention may be implemented is illustrated. It should be noted that a variety of processors other than processor 120 can be used to implement the present invention without loss of generality.

Processor 120 includes an instruction cache 21 to store instructions received from memory 130 and a data cache 22 to store computer data received from memory 130. There is also provided a data RAM 23 which is accessible to software for efficiency and an interrupt controller 24 which provides a means for requesting interrupts.

Processor 120 communicates with external components such as memory 130 through an external bus 32. The bus control unit 25 is used to direct data transfer into and out of the processor. According to FIG. 2, processor 120 includes three functional units for carrying out instructions. However, processor 120 may contain more or less than three functional units. The functional units illustrated on FIG. 2 include a multiply divide unit 27, an execution/address generation unit 28 and a memory interface unit 38 for processing memory requests based on addresses generated by execution/address generation unit 28. Instructions are propagated to the functional units through an instruction sequencer 26 which is coupled to instruction cache 21 via an instruction bus 42. Instruction sequencer 26 receives instructions from instruction cache 21 and decodes instructions to be executed by one of the functional units. Typically, an instruction code (for register instruction) will include an operation code and provide information identifying the location of the source operands for the instruction (SRC1 and/or SRC2) as well as indicating a destination (DEST) address for the result of the operation by the execution units.

Within the processor illustrated in FIG. 2, all operations take place at the register level. Source operands specify a global register, a local register or a constant value as instruction operands. The functional units are coupled to the register file 30 via bus 48.

In one embodiment, register file 30 includes two source registers which may hold two streams of data. The two streams of data may be transferred to processor 120 from an external source (e.g., memory 130) or may be created as a result of one or more internal operations. In one embodiment, instruction cache 21 stores an interleaving instruction (referred to as bit_interleaver) received from memory 130. Instruction sequencer 26 decodes the bit_interleaver instruction and transfers it to execution/address generation unit 28. Execution/address generation unit executes the bit_interleaver instruction, thereby interleaving two streams of data from the source registers into one stream of data in a destination register. The bit_interleaver instruction performs the interleaving operation at a bit-level as opposed to prior art interleaving operations that are performed for bytes, words or double-words (e.g., Intel multimedia (MMX™) instructions such as punpcklbw, punpcklwd, and punpckldq). Performing the interleaving operation at a bit level reduces the code size and the number of executed instructions involved in the interleaving. The bit_interleaver instruction will be described in greater detail below.

Figure 3:
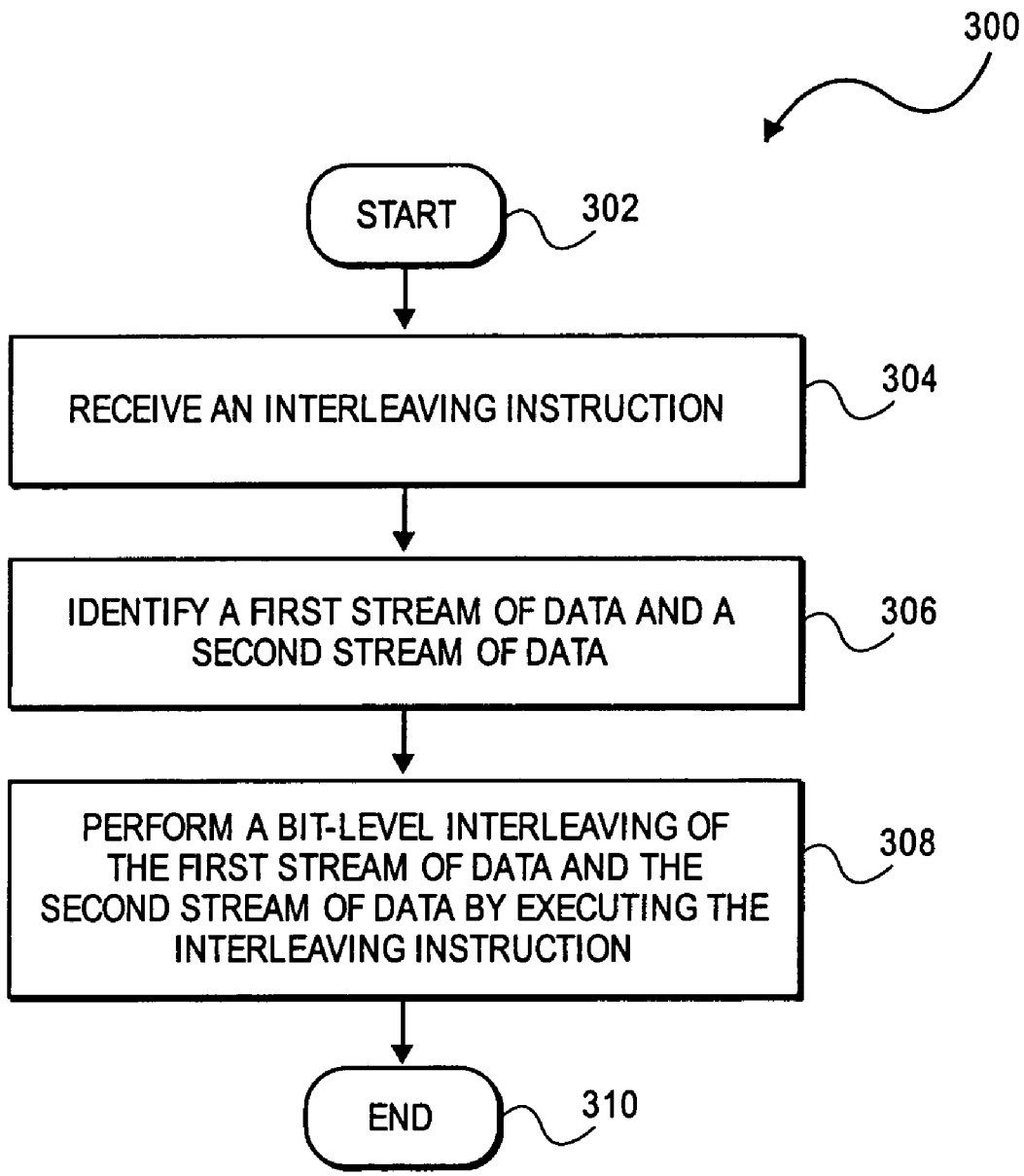
FIG. 3 is a flow diagram of a method for interleaving two streams of data, according to one embodiment of the present invention.

FIG. 3 is a flow diagram of a method 300 for interleaving two streams of data, according to one embodiment of the present invention. Method 300 begins with receiving an interleaving instruction (referred to as "bit_interleaver") at processing block 304. At processing block 306, two streams of data are identified. In one embodiment, the bit_interleaver instruction specifies locations of two source registers storing the above streams of data. In one embodiment, each of the two streams of data is a stream of encoded data bits created by the "Convolutional Encoder" algorithm which will be described in greater detail below. Alternatively, the data streams may be created by any known in the art communication or general algorithm other than the "Convolutional Encoder" algorithm if such an algorithm includes bit manipulation (e.g., Bluetooth™ physical layer algorithms or other IEEE 802.11a algorithms). Each of the two streams of data includes 16 data bits. It should be noted that the length of the data streams may vary (e.g., the data streams may include 8 bits, 32 bits, 64 bits, etc.) and therefore should not limit the scope of the present invention.

At processing block 308, a bit-level interleaving operation is performed on the two streams of data, generating a combined stream of data. The bit-level interleaving operation is performed by executing the bit_interleaver instruction. In one embodiment, the execution of the bit_interleaver instruction results in moving data bits of the first stream to even positions of a destination register and moving data bits of the second stream to odd positions of the destination register, thereby creating a combined stream of data in the destination register. The bit_interleaver instruction is described in greater detail below in conjunction with FIG. 6.

Figure 4:
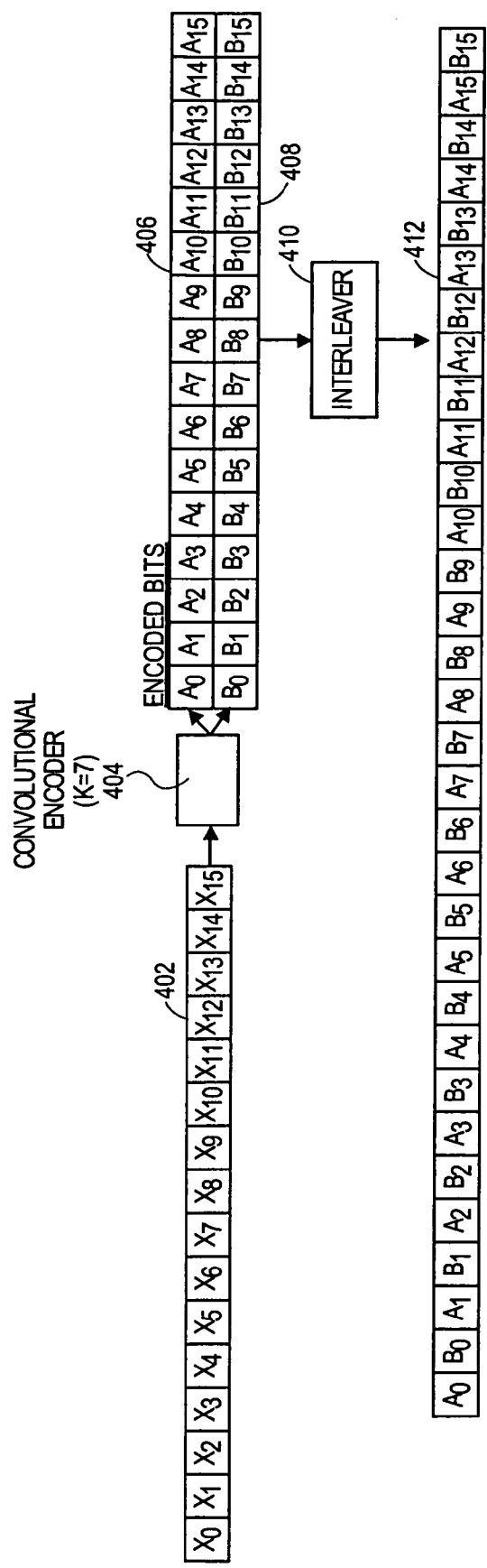
FIG. 4 illustrates an exemplary "Convolutional Encoder" algorithm in which a bit_interleaver instruction can be implemented.

FIG. 4 illustrates an exemplary "Convolutional Encoder" algorithm 404 in which the bit_interleaver instruction may be implemented. The "Convolutional Encoder" algorithm 404 described herein is defined by the IEEE 802.11a standard.

The algorithm 404 receives a stream 402 of data bits and generates two streams of encoded bits: stream 406 and stream 408. The streams of encoded bits are generated using any known in the art technique (e.g., the industry-standard generator polynomials $g_0=113_8$ and $g_1=171_8$, of rate $R=\frac{1}{2}$). The encoded streams are then interleaved by an interleaver algorithm 410, generating one stream 412 of data bits. Conventional interleaver algorithms include multiple instructions to facilitate interleaving of data bits of the two streams. For instance, a reduced instruction set computing (RISC) microprocessor design implements an interleaver algorithm illustrated in FIG. 5.

Figure 5:
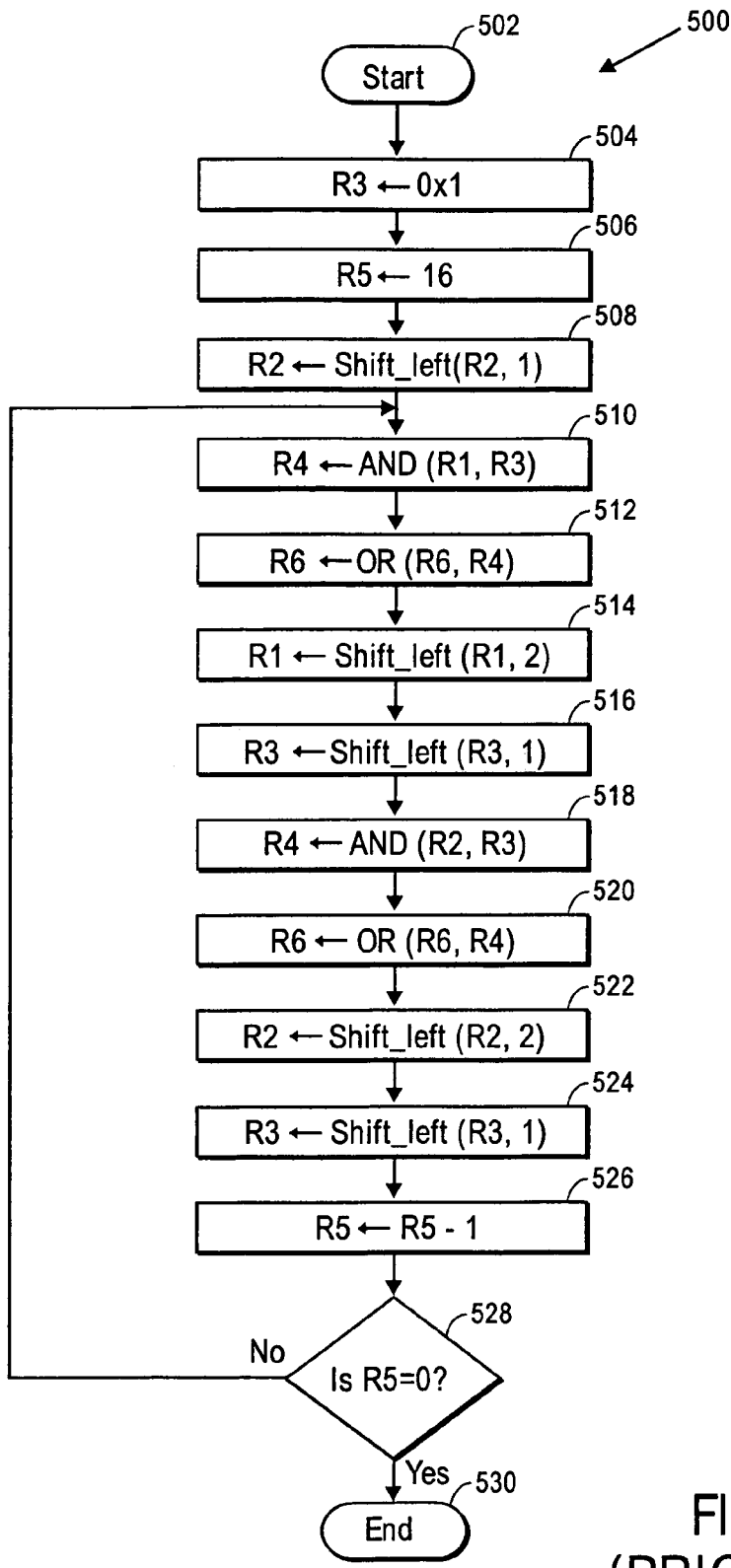
FIG. 5 is a flow diagram of a method for interleaving two streams of data, according to a prior art embodiment.

Referring to FIG. 5, a prior art method 500 for interleaving two streams of data is shown. The two streams of data bits are stored in registers R1 and R2. Registers R3 and R4 are used as temporary registers, register R5 stores the loop counter and register R6 stores the resulting stream of interleaved bits.

Method 500 begins with placing the value of 1 in the 0-bit position of register R3 (processing block 504). Next, the value representing the number of iterations is placed into register R5 (processing block 506), and the data stream stored in register R2 is shifted one position to the left (processing block 508). Further, processing blocks 510-526 are performed to interleave bit 0 of the first data stream and bit 0 of the second data stream. At processing block 526, the number of iterations is reduced by one, and a determination is made as to whether the number of iterations reached the value of zero (decision box 528). If the number of iterations is not equal to zero, processing blocks 510-526 are repeated until all bits of the two streams are interleaved (i.e., until R5=0).

Accordingly, the code size of the interleaver algorithm illustrated on FIG. 5 is equal to 13 instructions, and the executed number of instructions is equal to 163 (i.e., the first 3 instructions and the loop resulting in 10 instructions executed 16 times). The bit_interleaver instruction reduces both the code size of the above algorithm and the number of executed instructions, thereby providing an efficient mechanism for performing bit-level interleaving operations.

The bit_interleaver instruction operates on two source registers and performs bit interleaving on their lower 16 bits into a destination register. The syntax of the bit_interleaver instruction can be written as follows:

$$Dest = Bit\_Interleaver(Src_1, Src_2) \quad (1)$$

The semantics of the bit_interleaver instruction can be expressed as $$Dest(i) = \begin{cases} Src_1\left(\frac{i}{2}\right) & \text{For } i = 0, 2, 4, 6, \ldots, 30 \\ Src_2\left(\frac{i-1}{2}\right) & \text{For } i = 1, 3, 5, 7, \ldots, 31 \end{cases} \quad (2)$$

where Dest(i) represents positions of bits in the destination register, $$Src_2\left(\frac{i}{2}\right)$$

represents positions of bits in the first source register, and $$Src_2\left(\frac{i-1}{2}\right)$$

represents positions of bits in the second source register.

Figure 6:
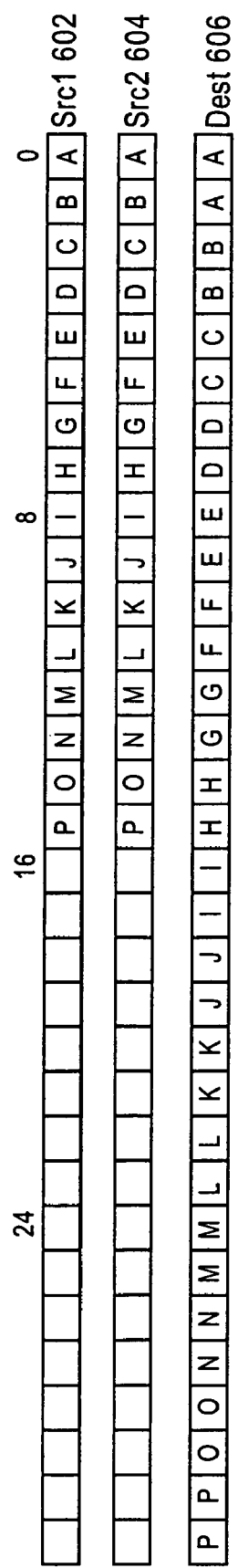
FIG. 6 illustrates the execution of a bit-interleaver instruction, according to one embodiment of the present invention.

FIG. 6 illustrates the execution of a bit-interleaver instruction, according to one embodiment of the present invention. Register 602 is a first source register, register 604 is a second source register, and register 606 is a destination register. Using the above formula 2, the processor places data bits of the first stream into even positions of the destination register and data bits of the second stream into odd positions of the destination register. Accordingly, the code size of the prior art interleaver algorithm is reduced from 13 to 1 and the number of executed instruction is reduced from 163 to 1.

Thus, a method and apparatus for interleaving data streams have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computerized method comprising:
   identifying a first stream of data stored in first source register and a second stream of data stored in a second source register; and
   performing a single bit-level interleaving instruction on the first stream of data and the second stream of data to generate a combined stream of data in a destination register, wherein syntax of the bit-level interleaving instruction is expressed as $$Dest = Bit\_interleaver(Src_1, Src_2),$$

wherein Dest identifies the destination register, $Src_1$ identifies the first source register, $Src_2$ identifies the second source register, and Bit_interleaver identifies a bit interleaving operation.

2. The method of claim 1 further comprising:
   receiving the interleaving instruction.

3. The method of claim 1 wherein each of the first stream and the second stream includes 16 bits of encoded data.

4. The method of claim 1 wherein the bit interleaving instruction is a single executed instruction.

5. An apparatus comprising:
   an instruction memory to store an interleaving instruction;
   an instruction sequencer, coupled to the instruction memory, to receive the interleaving instruction;
   an execution unit, coupled to the instruction sequencer, to execute the interleaving instruction, the interleaving instruction generating a combined stream of data by a bit-level interleaving of a first stream of data and a second stream of data; and
   a register file, coupled to the execution unit, the register file including a first source register to hold the first stream of data, a second source register to hold the second stream of data, and a destination register to hold the combined stream of data, wherein syntax of the interleaving instruction is expressed as $$Dest = Bit\_interleaver(Src_1, Src_2),$$

wherein Dest identifies the destination register, $Src_1$ identifies the first source register, $Src_2$ identifies the second source register, and Bit_interleaver identifies a bit interleaving operation.

6. The apparatus of claim 5 wherein each of the first stream and the second stream includes 16 bits of encoded data.

7. A computer system comprising:
   a memory to store computer data and instructions; and
   a processor, coupled to the memory, to receive a first stream of data, a second stream of data, and an interleaving instruction from the memory, to store the first stream of data in a first source register and a second stream of data in a second source register, and to execute the interleaving instruction on the first stream of data and the second stream of data, the interleaving instruction to generate a combined stream of data in a destination register by a bit-level interleaving of the first stream of data and the second stream of data, wherein syntax of the interleaving instruction is expressed as $Dest=Bit\_interleaver(Src_1, Src_2)$, wherein Dest identifies the destination register, $Src_1$ identifies the first source register, $Src_2$ identifies the second source register, and Bit_interleaver identifies a bit interleaving operation.

8. The system of claim 7 wherein each of the first stream and the second stream includes 16 bits of encoded data.

9. A computer readable medium that provides instructions, which when executed on a processor, cause said processor to perform operations comprising:
identifying a first stream of data stored in a first source register and a second stream of data stored in a second source register; and
performing a single bit-level interleaving instruction on the first stream of data and the second stream of data to generate a combined stream of data in a destination register, wherein syntax of the bit-level interleaving instruction is expressed as $Dest=Bit\_interleaver(Src_1, Src_2)$, wherein Dest identifies the destination register, $Src_1$ identifies the first source register, $Src_2$ identifies the second source register, and Bit_interleaver identifies a bit interleaving operation.

10. The computer readable medium of claim 9 providing further instructions causing the processor to perform operations comprising:
receiving the interleaving instruction.

11. The computer readable medium of claim 9 wherein each of the first stream and the second stream includes 16 bits of encoded data.

* * * * *